United States Patent Office 3,461,684
Patented Aug. 19, 1969

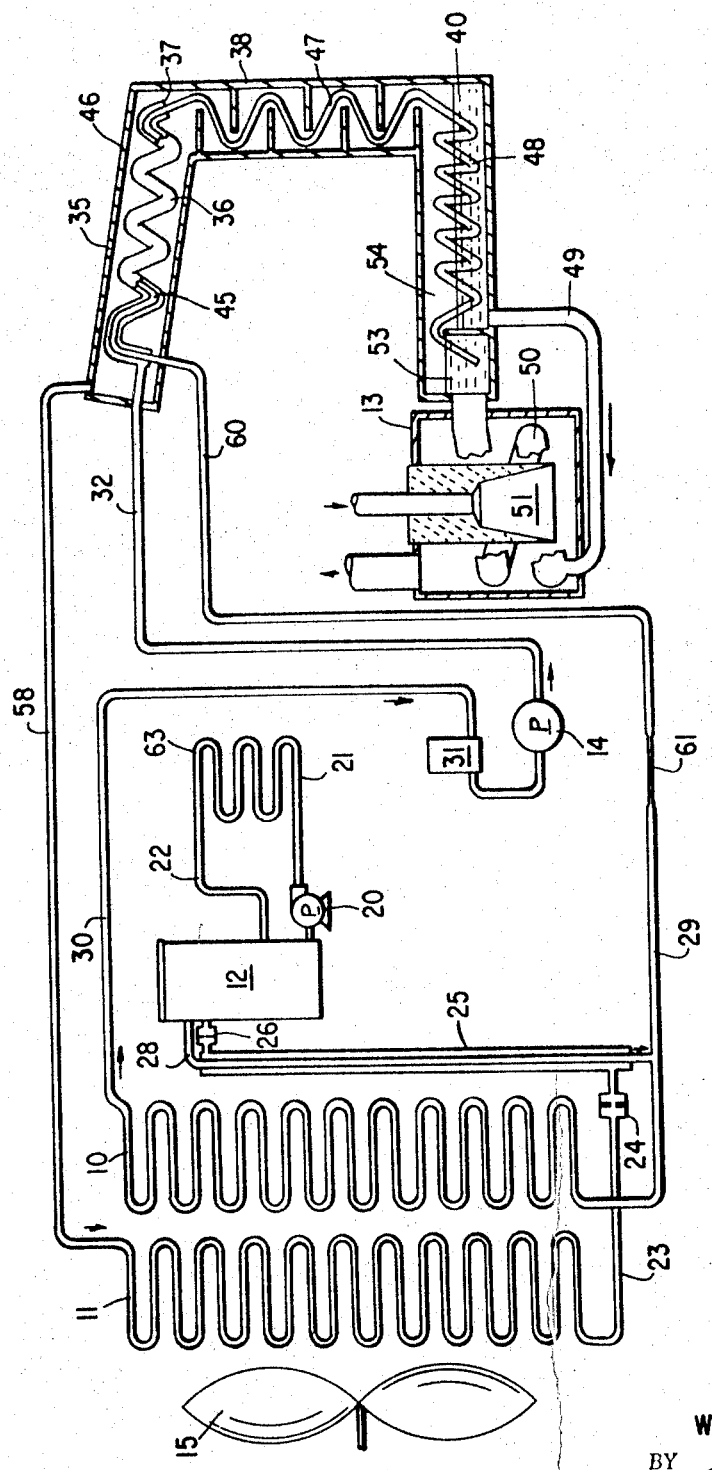
Aug. 19, 1969    W. M. SIMPSON    3,461,684
ABSORPTION REFRIGERATION MACHINE
Filed Dec. 4, 1967    2 Sheets-Sheet 1
FIG. I
INVENTOR.
WALTER M. SIMPSON.
BY James E Schardt
ATTORNEY.

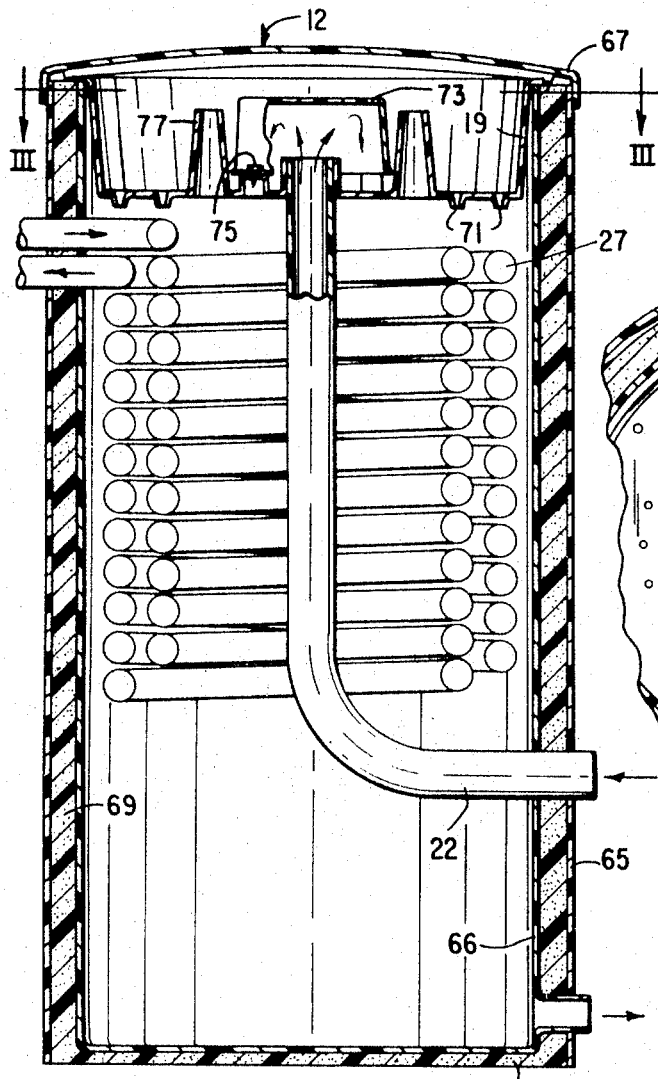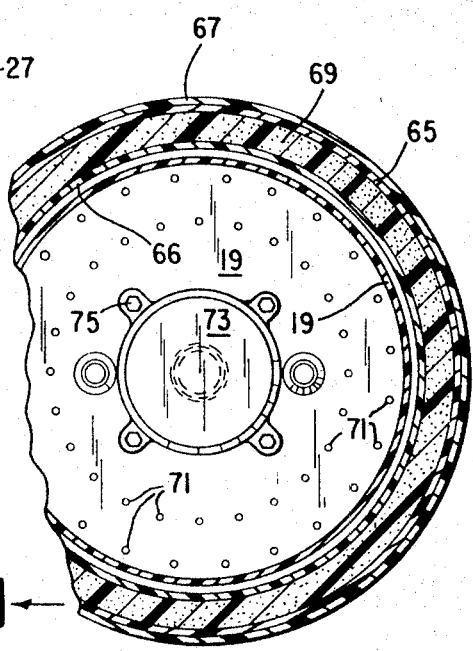

3,461,684
ABSORPTION REFRIGERATION MACHINE
Walter M. Simpson, Indianapolis, Ind., assignor to Carrier Corporation, Syracuse, N.Y., a corporation of Delaware
Filed Dec. 4, 1967, Ser. No. 687,838
Int. Cl. F25b 15/00; B67d 5/62
U.S. Cl. 62—476      3 Claims

ABSTRACT OF THE DISCLOSURE

An absorption refrigeration system employing an improved chiller to cool a liquid heat exchange medium which is passed to a remote location to provide cooling.

Background of the invention

Absorption refrigeration systems of the type with which this invention is concerned generally include an evaporator section or chiller having an evaporator coil through which refrigerant is passed in heat exchange relation with liquid heat exchange medium such as water which is distributed over the evaporator coil, the water being cooled by heat exchange with the refrigerant, thereby evaporating the refrigerant. The chilled water is forwarded to a heat exchanger in a remote location to satisfy a cooling load and is returned from the remote location to be recooled in the chiller. For maximum system efficiency, heat transfer in the chiller between the water and the refrigerant in the evaporator coil must be optimized. Further, the chiller should be constructed to minimize heat transfer to the surrounding air.

Since these chillers are ordinarily placed in an outdoor location, the water in the chiller is subject to freezing in northern areas of the country during the winter when the machine is shut down. For this reason, the chiller should be designed so that the water in the chiller may freeze without damaging the chiller.

Summary of the invention

This invention relates to an absorption refrigeration machine including a water chiller employing a novel water distribution tray for improved coverage of the evaporator coil by the water discharged from the tray. Further, the chiller insulation is so arranged as to provide selective freezing of the water therein when subjected to subfreezing weather to prevent damage to the chiller.

Brief description of the drawings

FIGURE 1 is a schematic flow diagram of an absorption refrigeration system employing this invention;

FIGURE 2 is a sectional view of the water chiller of the present invention; and

FIGURE 3 is a sectional view of the water chiller taken along line III—III of FIGURE 2.

Description of the preferred embodiment

Referring to FIGURE 1, there is shown a refrigeration system having an absorber 10, a condenser 11, an evaporator or chiller 12 and a generator 13 connected to provide refrigeration. A pump 14 is employed to circulate weak absorbent solution from absorber 10 to generator 13. As used herein, the term "weak absorbent solution" refers to a solution which is weak in absorbing power and the term "strong absorbent solution" refers to a solution which is strong in absorbing power. A suitable absorbent solution for use in the system described is water and a suitable refrigerant is ammonia.

Liquid refrigerant is passed from condenser 11 through liquid line 23, refrigerant restriction 24, the exterior passage of heat exchanger 25, and second refrigerant restriction 26 to evaporator coil 27 of chiller 12. Heat from the water to be chilled which passes over the exterior of evaporator coil 27 is given up to the refrigerant which vaporizes in the interior passage of coil 27. The refrigerant vapor passes from coil 27 through vapor line 28, the interior passage of heat exchanger 25 to line 29 where it is mixed with strong solution returning to the absorber from the generator.

The mixture of refrigerant vapor and strong solution passes through line 29 into the heat exchange coil which forms absorber 10. Air is passed over the exterior of the absorber coil by fan 15 to cool absorbent solution therein and increase its absorbing power. The absorbent solution absorbs refrigerant vapor during its passage through the absorber so that the refrigerant vapor is completely absorbed and the solution is thereby weak in absorbing power when the absorbent solution is discharged from the absorber coil.

The weak solution passes through line 30 to purge tank 31 where noncondensible gases are collected and withdrawn from the system. The weak solution is then forwarded by solution pump 14 through line 32 to the combination rectifier and heat exchanger section 35. The weak solution passes through coil 36 in the space between inner heat exchange coil 45 and outer heat exchange coil 36 where it is heated to substantially its boiling point by heat exchange with strong solution passing from the generator to the absorber. After passing through coil 36 the heated weak solution is discharged from opening 37 into analyzer column 38 where it passes successively over a plurality of plates therein. The plates in the analyzer column 38 provide surfaces for contact of vapor with the solution which wets the surfaces of the plates. The weak solution passes successively over the plates and is discharged from the bottom of the analyzer into generator reservoir 40.

Weak solution from reservoir 40 passes through line 49 into generator coil 50 where it is heated by suitable means such as a gas burner 51 causing the solution to boil off refrigerant to regenerate the solution. The vaporized refrigerant and hot strong solution is discharged into chamber 53, the solution collecting at the bottom of the chamber. It will be understood that the solution in chamber 53 has been concentrated by vaporizing refrigerant therefrom in generator 13. The vapor formed in generator 13 passes through the vapor passage 54 formed in the upper portion of generator reservoir 40 through analyzer 38 and through the vapor passage formed by shell 46 of rectifier 35 through line 58 to condenser 11.

The strong solution from chamber 53 is at a relatively high generator pressure and passes through heat exchange coil 48 in generator reservoir 40, heat exchange coil 47 in the analyzer column, and inner heat exchange coil 45 in the rectifier. The strong solution then passes through line 60 and restriction 61 into line 29 and absorber 10 on the relatively low pressure side of the system.

Heat from the strong solution passing through coil 48 boils the weak solution in the generator reservoir to vaporize refrigerant therefrom. The heat exchange which takes place in the generator reservoir results in cooling the strong solution flowing through coil 48 so that it enters the analyzer and rectifier respectively at the best temperature to achieve maximum efficiency with minimum heat transfer surface.

The vapor formed in the generator and in the reservoir passes through the upper portion of the reservoir, contacting the exposed portion of coil 48. It will be appreciated that vapor will be boiled from the weak solution in the reservoir and that water vapor will be condensed from the vapor space into the weak solution in proportions resulting in an enrichment of the refrigerant content of the vapor passing through the reservoir. Also, the condensation of water vapor into the weak solution will liberate additional heat which assists in vaporizing the solution.

Similarly, as the vapor passes from the reservoir through analyzer 38 heat transfer takes place between the weak solution passing downwardly over the plates in the analyzer and further enriches the refrigerant content of the vapor. The vapor thereafter passes through rectifier 35 in heat exchange relation with the weak solution passing through coil 36. This heat transfer results in condensing additional water from the vapor which then leaves the rectifier in a highly purified or enriched state.

As the vapor passes through rectifier 35 the solution which is condensed flows by gravity to analyzer 38 and passes downwardly through the analyzer along with weak solution discharged from outlet 37 of coil 36. This rectifier condensate is heated along with weak solution in the analyzer to produce additional vapor by heat exchange with the strong solution passing through the coil therein.

Chilled water pump 20 is provided for forwarding water or other heat exchange medium chilled in evaporator 12 through chilled water line 21 to heat exchanger 63 in a suitable remote location to satisfy a cooling load. The water is then returned from heat exchanger 63 through chilled water line 22 to a distribution tray 19 in chiller 12 from which it is distributed over the exterior of evaporator coil 27 in chiller 12.

In accordance with this invention, the chiller 12 comprises an outer cylindrical shell 65 having a top member 67 secured thereto. A cylindrical liner 66 is disposed within shell 65 in spaced relation thereto. A suitable insulating urethane foam 69 is provided between shell 65 and liner 66 and on the bottom of liner 66. The insulation is preferably foamed into place to form a complete assembly and hold shell 65 and liner 66 together.

The chiller insulation serves a plurality of functions. The insulation on the bottom of the chiller provides a bottom closure for exterior shell 65. Further, the insulation which surrounds liner 66 decreases heat transfer between the cold interior of the chiller and the warm ambient air on the chiller exterior under normal operating conditions to provide peak chiller efficiency.

The insulation also serves a third purpose. As can be seen from FIGURE 2, the side insulation is thicker than the bottom insulation on the chiller. Thus, during subfreezing weather when the refrigeration system is inoperative, the water in the chiller will freeze from the bottom up which will allow harmless expansion in an upward direction to prevent damage to the chiller.

The double row coil 27 in chiller 12 is disposed within liner 66 for passage of refrigerant therethrough. The distribution tray 19 which is disposed above coil 27 receives water returned from heat exchanger 63 through return water line 22. Distribution tray 19 is provided with two concentric rows of downwardly directed nozzles 71 which are aligned with the two rows of coil 27. The nozzles 71 provide an extremely accurate discharge of water from tray 19 onto both rows of coil 27 which assures complete coverage of the entire coil surface with water for maximum heat exchange efficiency between the water and the refrigerant in the coil. A cap 73 is suitably affixed to tray 19 as by screws 75 to deflect the stream of water from line 22 downward into tray 19. Overflow towers 77 are also provided in tray 19 to prevent an excessive accumulation of water therein.

While I have described a preferred embodiment of my invention it will be understood the invention is not limited thereto but may be otherwise embodied within the scope of the following claims.

I claim:
1. An absorption refrigeration system comprising:
an absorber for absorbing refrigerant vapor;
a generator for concentrating weak absorbent solution by evaporating refrigerant therefrom;
a condenser for condensing refrigerant vaporized in said generator; and
an evaporator for evaporating refrigerant to produce cooling, said evaporator comprising:
    a casing including a shell for enclosing the top and sides of said evaporator;
    a liner having side walls and a bottom wall disposed in said shell;
    first insulation means disposed between the shell and the side walls of said liner;
    second insulation means disposed within said shell covering the bottom wall of said liner, said second insulation means serving as a bottom closure for said shell, said first insulation means being more effective than said second insulation means to provide selective freezing of the heat exchange medium in subfreezing weather to prevent damage to the evaporator;
    an evaporator coil disposed in said casing adapted for refrigerant flow therethrough; and
    a distribution tray disposed in said casing above said coil for receiving the heat exchange medium to be cooled, said distribution tray including a plurality of downwardly directed nozzles, each nozzle being adapted to discharge heat exchange medium directly against the uppermost portion of the coil to provide a substantial uniform coverage of the coil with the medium to be cooled.

2. An absorption refrigeration system according to claim 1 wherein said evaporator coil comprises two concentric coils,
said distribution tray including two concentric rings of downwardly directed nozzles, each nozzle being adapted to discharge heat exchange medium directly against the uppermost portion of the cooperating section of the coil to provide a substantially uniform coverage of the coil with the medium to be cooled.

3. An absorption refrigeration system according to claim 1 wherein said distribution tray includes a first tower for passage therethrough in an upward direction of the medium to be cooled;
an overflow tower formed in said tray for passage of excess heat exchange medium from said tray into said liner; and
a cap disposed over said first tower to deflect heat exchange medium from said tower into said tray to prevent impingement of the heat exchange medium on the top of said shell.

References Cited

UNITED STATES PATENTS

| | | | |
|---|---|---|---|
| 1,380,967 | 6/1921 | Jensen | 165—117 |
| 2,033,185 | 3/1936 | Dodd | 165—115 |
| 2,210,200 | 8/1940 | Brant | 165—117 |
| 2,932,490 | 4/1960 | Olander | 165—117 |
| 3,279,202 | 10/1966 | Eberg | 62—476 |

LLOYD L. KING, Primary Examiner

U.S. Cl. X.R.

62—394, 399; 165—117